United States Patent
Baacke et al.

(10) Patent No.: US 9,161,580 B2
(45) Date of Patent: Oct. 20, 2015

(54) METHOD OF FORMING MOLDED ARTICLES OF CLOTHING WITH NON-MOLDED COMPONENTS

(71) Applicant: LI & FUNG (B.V.I.) LTD, Tortola, Virgin Islands (GB)

(72) Inventors: Dennis R. Baacke, Irma, WI (US); Aly Khalifa, Raleigh, NC (US)

(73) Assignee: Li & Fung (B.V.I.) Ltd., Tortola (VG)

( * ) Notice: Subject to any disclaimer, the term of this patent is extended or adjusted under 35 U.S.C. 154(b) by 0 days.

(21) Appl. No.: 14/535,548

(22) Filed: Nov. 7, 2014

(65) Prior Publication Data
US 2015/0059053 A1   Mar. 5, 2015

Related U.S. Application Data

(62) Division of application No. 11/780,587, filed on Jul. 20, 2007, now Pat. No. 8,881,313.

(60) Provisional application No. 60/843,690, filed on Sep. 11, 2006.

(51) Int. Cl.
| | |
|---|---|
| *A41D 19/04* | (2006.01) |
| *A41D 19/00* | (2006.01) |
| *B29D 99/00* | (2010.01) |
| *B29K 711/08* | (2006.01) |
| *B29L 31/48* | (2006.01) |

(52) U.S. Cl.
CPC ............... *A41D 19/04* (2013.01); *A41D 19/00* (2013.01); *A41D 19/0058* (2013.01); *B29D 99/0067* (2013.01); *A41D 2300/50* (2013.01); *A41D 2400/20* (2013.01); *B29K 2313/00* (2013.01); *B29K 2711/08* (2013.01); *B29L 2031/48* (2013.01); *B29L 2031/4864* (2013.01)

(58) Field of Classification Search
CPC   A41D 19/04; A41D 2500/50; A41D 19/0055
USPC ........................ 2/159, 161.1, 160, 161.2, 167
See application file for complete search history.

(56) References Cited

U.S. PATENT DOCUMENTS

| | | |
|---|---|---|
| 2,785,412 A | 3/1957 | Zelenka |
| 3,290,659 A | 12/1966 | Burtoff |
| 3,975,776 A | 8/1976 | Ayre |
| 4,047,251 A | 9/1977 | Stockum |
| 4,051,553 A | 10/1977 | Howard |
| 4,089,070 A | 5/1978 | Cherry |
| 4,245,357 A | 1/1981 | Connelly |
| 4,283,244 A | 8/1981 | Hashmi |
| 4,590,627 A | 5/1986 | Connelly |

(Continued)

FOREIGN PATENT DOCUMENTS

FR   2713048   6/1995

*Primary Examiner* — Richale Quinn
(74) *Attorney, Agent, or Firm* — Boyle Fredrickson, S.C.

(57) ABSTRACT

The present invention is an article of clothing, such as a glove, formed with a flexible, moldable material section forming one or more of the portions of the article of clothing. The moldable sections utilized in constructing the article of clothing are formed in a molding process which allows for the formation of the sections in a desired shape and/or with various function-enhancing members integrally on the moldable portions. In addition, the molding process for forming the moldable sections can be used to bond the moldable sections to the other non-moldable sections used in the construction of the article of clothing.

5 Claims, 5 Drawing Sheets

(56) References Cited

U.S. PATENT DOCUMENTS

| | | |
|---|---|---|
| 4,594,736 A | 6/1986 | Connelly |
| 4,751,750 A | 6/1988 | Tepley |
| 4,766,914 A | 8/1988 | Briggs |
| 4,785,479 A | 11/1988 | Watanabe |
| 5,117,509 A | 6/1992 | Bowers |
| 5,140,709 A | 8/1992 | Cohn et al. |
| 5,251,335 A | 10/1993 | DeFusco |
| 5,402,537 A | 4/1995 | Kolada |
| 5,442,816 A | 8/1995 | Seketa |
| 5,511,248 A | 4/1996 | Widdemer |
| 5,682,613 A | 11/1997 | Dinatale |
| 5,687,424 A | 11/1997 | Masley |
| 5,697,104 A | 12/1997 | Welton |
| 5,706,522 A | 1/1998 | Ballarino et al. |
| 5,794,266 A | 8/1998 | Han |
| 5,893,172 A | 4/1999 | Haynes et al. |
| 5,983,395 A | 11/1999 | Lei |
| 5,991,926 A | 11/1999 | Lakusiewicz |
| 6,044,493 A | 4/2000 | Post |
| 6,065,155 A | 5/2000 | Sandusky |
| 6,209,138 B1 | 4/2001 | Kang |
| 6,415,446 B1 | 7/2002 | McLean et al. |
| 6,618,860 B1 | 9/2003 | Sullivan et al. |
| 6,669,657 B1 | 12/2003 | Ongwela |
| 6,675,392 B2 | 1/2004 | Albert |
| 6,766,536 B1 | 7/2004 | Aarons |
| 6,912,731 B2 | 7/2005 | Cass |
| 6,993,793 B1 | 2/2006 | Li |
| 7,000,257 B2 | 2/2006 | Bevier |
| 7,100,212 B2 | 9/2006 | Jaeger |
| 7,159,246 B2 | 1/2007 | Tippey |
| 2006/0130212 A1 | 6/2006 | Kishihara |
| 2009/0139011 A1 | 6/2009 | VanErmen et al. |

METHOD OF FORMING MOLDED ARTICLES OF CLOTHING WITH NON-MOLDED COMPONENTS

CROSS-REFERENCE TO RELATED APPLICATIONS

This application is a divisional of U.S. application Ser. No. 11/780,587, filed Jul. 20, 2007, which claims the benefit of U.S. Provisional Application No. 60/843,690, filed on Sep. 11, 2006, which is incorporated by reference herein in its entirety.

FIELD OF THE INVENTION

The present invention relates to articles of clothing, and more specifically to articles of clothing having sections formed of moldable materials that are connected in a non-conventional manner to sections formed of non-moldable materials.

BACKGROUND OF THE INVENTION

In the past, many different types of articles of clothing have been manufactured with different types of materials in a single article, in order to provide the article of clothing with various attributes or features that enhance the usefulness of the article of clothing.

One example of an article of clothing that has been manufactured in the past in this manner is a glove. Gloves have long been used to cover an individual's hand in various circumstances and conditions, such as to provide increased gripping ability to the individual's hands when working or playing sports. Gloves have been modified over the years to provide enhanced gripping ability or functionality to an individual wearing the gloves as a result of various additions made to the glove construction, including but not limited to various components attached to the exterior of the gloves, to the interior of the gloves, and modifications to the materials from which the gloves are manufactured.

One type of material that has more recently been utilized in the manufacture of gloves used for these purposes is a flexible, thermoplastic material, such as polyurethane or silicone rubber, which provides increased functionality, e.g., water resistance, and gripping ability to certain individuals wearing gloves of this type. Other materials can also be utilized in conjunction with the thermoplastic materials in different situations that providing various additional benefits to the wearer, including gloves formed with leather sections as well as sections formed of the thermoplastic materials.

However, while a number of different glove constructions have previously been developed which include modified glove materials, i.e., thermoplastic materials, to enhance the functionality of the gloves, these prior art glove constructions use the thermoplastic materials in conventional manners, such as by attaching the thermoplastic material sections to the remaining section of the glove by either adhering the thermoplastic sections to the exterior and/or interior surfaces of the glove, or utilizing a conventional mechanical attachment means, i.e., stitching, to secure the various sections of the glove to one another. In each case, the thermoplastic sections can easily become separated and/or damaged with regard to the non-thermoplastic sections during normal use of the gloves. Also, the requirements for properly positioning and securing the various sections to one another using the stitching requires a number of steps that greatly increase the overall cost for manufacturing these gloves.

One alternative glove construction that has been developed is disclosed in Bevier U.S. Pat. No. 7,000,257, incorporated by reference herein, which secures various sections of a glove to one another in a stitch-less manner. In one embodiment, this attachment of the sections is accomplished by abutting two adjacent sections the glove construction and overlaying the adjacent edges of the glove sections with a thermoplastic polymer adhesive element that formed a securing "bridge" between the glove sections to hold them together without the need for stitching. The thermoplastic polymer adhesive element also provides an attachment point for a covering glove section that can be secured to the face of the adhesive element opposite the joined glove sections. In a second embodiment, the thermoplastic polymer adhesive element is secured to the exterior surface of one glove section and operates to provide an attachment point for a separate glove section to be located in an overlapping configuration over the glove section to which the thermoplastic polymer adhesive element is attached.

However, due to the need for the separate thermoplastic polymer adhesive element in each embodiment of the glove shown in the '257 patent, the construction of the glove shown is no less complex and does not require any fewer steps than that for the prior art gloves utilizing stitching to secure the various components of the gloves to one another.

As a result, it is desirable to develop a glove construction, as well as a construction for other types of garments or articles of clothing, that includes sections formed of moldable, e.g., thermoplastic materials, to provide all of the benefits attendant therewith, but that is constructed in a manner that allows the moldable section or sections to be attached directly to other sections formed of different moldable or non-moldable materials, thereby reducing the complexity and expense of the construction for the article of clothing.

SUMMARY OF THE INVENTION

According to a first aspect of the present invention, an article of clothing, such as a glove, is provided in which the one or more portions of the article of clothing are formed at least partially of a moldable and flexible material, while the remainder of the article of clothing is formed of one or more separate sections of a functionally different material, such as synthetic woven or knit materials or leather, for example. The different materials that can be used as the moldable and flexible material include any materials that can be utilized in various types of molding processes, e.g., can be injected into a suitable mold in a flowable or liquid state and subsequently solidified, such as thermoset materials, thermoplastic materials, thermoplastic polyurethanes, and one or two component silicone rubbers, among other similar suitable materials. Further, throughout this application, when used in reference to the particular sections of the article of clothing formed of the moldable materials, the term "moldable" shall be construed to include each of these types of materials. Also, the term "non-moldable", when used in this application in reference to the sections of the article of clothing that are not formed of the flexible "moldable" materials, shall be construed to cover all types of materials that can be used in glove constructions, but that are not moldable, such as textile materials, including fabrics, woven or non-woven materials, and knit materials, among others.

The article of clothing formed with the flexible, moldable material sections enables the sections of the articles of clothing formed of this material to provide greatly increased functionality, e.g., gripping ability, to the articles of clothing that assists an individual wearing the article of clothing, such as when playing sports. The moldable material utilized in forming these sections of the article of clothing also can be easily modified in a molding process used to form the moldable material portions, such that the moldable material portions can include various additional enhancing features, such as enhanced gripping members, breathable apertures and the like. Also, other features can be secured to the sections of the articles of clothing formed from the moldable materials via more conventional manners including thermal bonding or stitching, such as a lining on the interior of the article of clothing.

According to another aspect of the present invention, the sections of the article of clothing formed of the moldable materials are secured to the sections of the article of clothing formed of the more conventional materials through an injection molding process. The non-moldable sections of the article of clothing are positioned within a mold conforming to the desired shape of the article of clothing. The moldable material is then injected into the mold to conform to the shape of the mold, and to flow around the exposed edges of the non-moldable material positioned within the mold. As the moldable material cools, it intimately and directly bonds with the non-moldable material to form the construction for the article of clothing. This bonding of the moldable material to the non-moldable material has various added benefits over conventional stitching. These benefits include the reduced size of the seam formed between the moldable material and the non-moldable material, or reduced "seam bulk," as well as the removal of the requirement for needle holes to allow stitching to pass through the materials, which can allow water to leak through the holes and into the glove in wet conditions.

Numerous other features, objects and advantages of the present invention will be made apparent from the following detailed description taken together with the drawing figures.

BRIEF DESCRIPTION OF THE DRAWINGS

The drawings illustrate the best mode currently contemplated as practicing the present invention.

In the drawings.

DETAILED DESCRIPTION OF THE INVENTION

Figure 1:
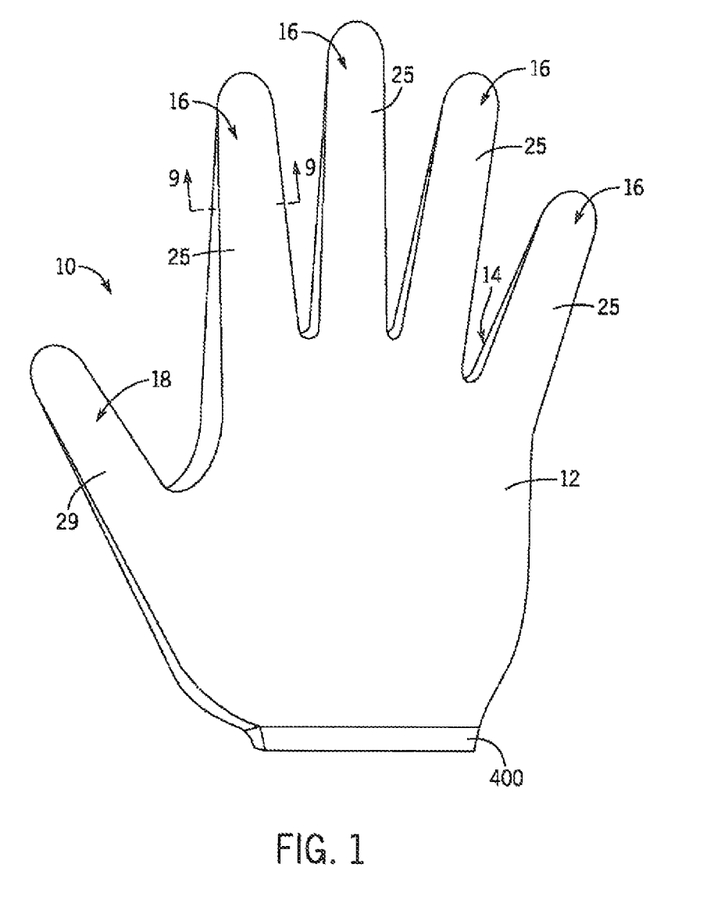
FIG. 1 is front plan view of a first embodiment of an article of clothing constructed according to the present invention.
Figure 2:
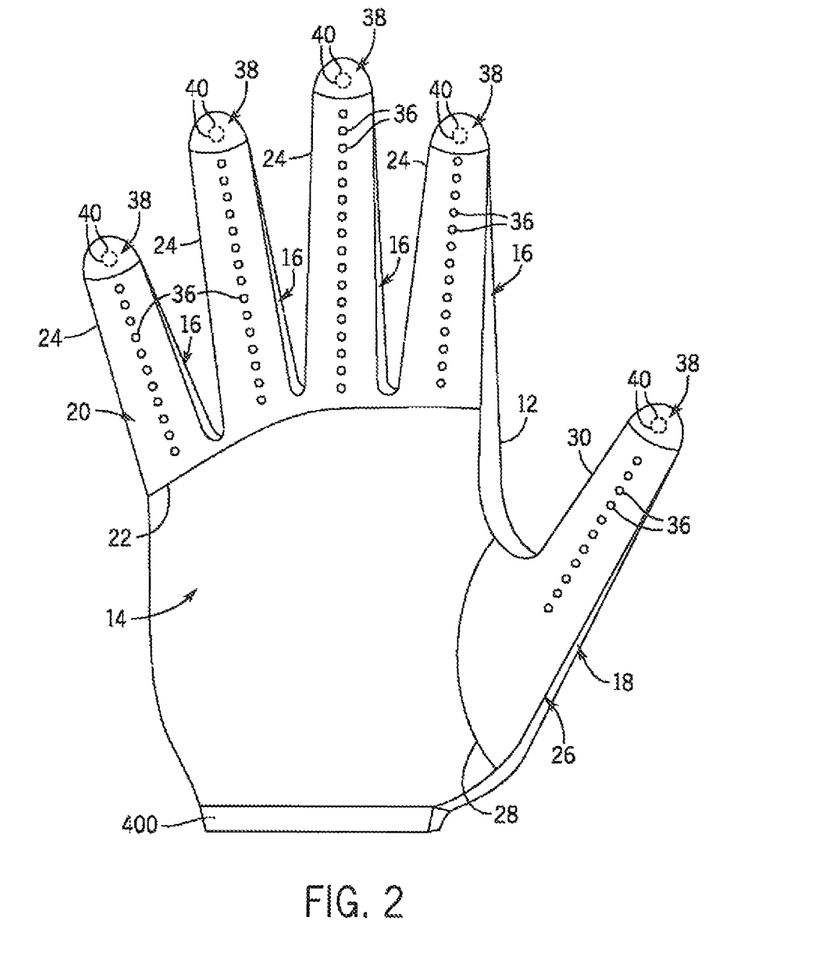
FIG. 2 is a rear plan view of the article of clothing of FIG. 1.

With reference now to the drawing figures in which like reference numerals designate like parts throughout the disclosure, an article of clothing constructed according to the present invention is indicated generally at 10 in FIG. 1. The article of clothing 10 is constructed as a glove 11 that includes a back portion 12 and a palm portion 14 that are joined to one another along their periphery to form the majority of the glove 11. A number of finger stalls 16 extend outwardly from the back portion 12 and the palm portion 14, in addition to a thumb stall 18 spaced from the finger stall 16. However, it is also contemplated that the glove 11 can be formed without the thumb stall 18, and/or without one or more of the finger stalls 16, in order for the construction of the glove 11 to conform to the particular use to which the glove 11 is to be put. In each of the varied constructions, the glove 11 will still be formed with the back portion 12 and the palm portion 14 joined to one another and designed to cover at least the palm and back of the hand of the wearer.

Looking now at FIGS. 1, 2 and 6-9, in a first embodiment of the construction for the glove 11, the finger stalls 16 of the glove 11 are at least partially formed of a moldable section 20. The moldable section 20 includes a base portion 22 that is secured to and extends outwardly from the palm portion 14, and a number of separate finger portions 24 extending outwardly from the base portion 22 opposite the palm portion 14. Each of the finger portions 24 of the moldable section 20 are secured to a non-moldable portion 25 forming the remainder of the finger stall 16 in order to form completely enclosed finger stalls as is known with prior art glove configurations. However, finger stalls 16 with open ends are also contemplated. The non-moldable portions 25 are preferably integrally formed with the non-moldable material constituting the back portion 12 of the glove 11, but may also be separately formed from the back portion 12 in order to increase the ease of construction of the glove 11.

Figure 6:
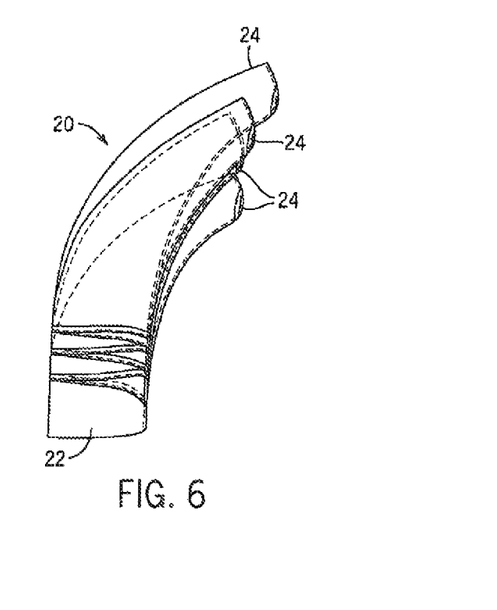
FIG. 6 is a side plan view of a finger portion of the article of clothing of FIG. 1.
Figure 7:
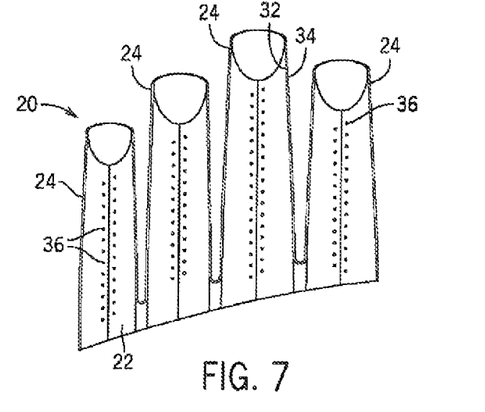
FIG. 7 is a top plan view of the finger portion of FIG. 6.
Figure 8:
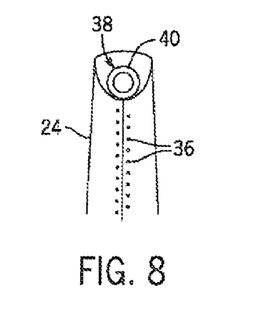
FIG. 8 is a partially broken away, bottom plan view of one of the fingers of the finger portion of FIG. 6.

In an alternative embodiment for the moldable section 20, the finger portions 24 of the moldable section 20 can be constructed as a tubular member with one open end (not shown) to form the entire finger stall 16. The finger portions 24 in this embodiment have the open end disposed adjacent the base portion 22, such that the open end allows for the finger of a wearer to be inserted into the respective finger portion 24 through the open end. Further, in this embodiment, the moldable section 20 can include a pair of base portions 22, such that the base portions 22 on each side of the moldable section 20 are connected to the palm portion 14 and back portion 12 of the glove 10, respectively.

Figure 3:
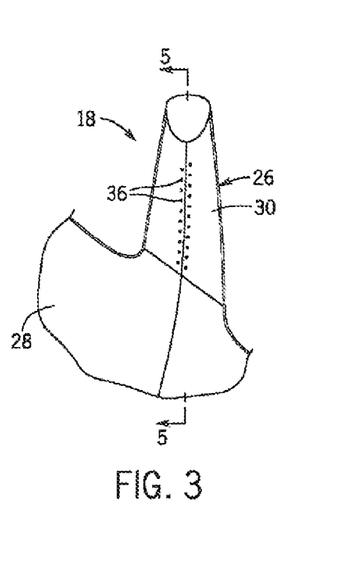
FIG. 3 is a top plan view of a thumb portion of the article of clothing of FIG. 1.
Figure 4:
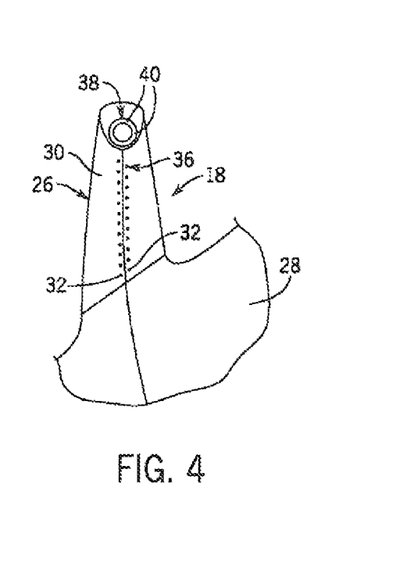
FIG. 4 is a bottom plan view of the thumb portion of FIG. 3.
Figure 5:
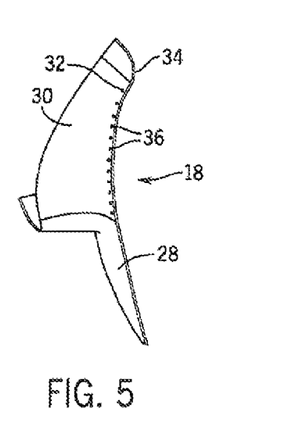
FIG. 5 is a cross-sectional view along line 5-5 of FIG. 3.

Similarly, looking now at FIGS. 3-5, the thumb stall 18 includes a moldable section 26 that includes a base portion 28 connected to the palm portion 14 and a thumb portion 30 extending outwardly therefrom and secured to a non-moldable portion 29 forming the remainder of the thumb stall 18 in order to form a completely enclosed thumb stall as is known with prior art glove configurations. Also similarly to the construction for the finger stalls 16, a thumb stall 18 with open ends is also contemplated, as is a construction where the non-moldable portions 29 is preferably integrally formed with the non-moldable material constituting the back portion 12 of the glove 10, but that may also be separately formed from the back portion 12 in order to increase the ease of construction of the glove 11. Further, the thumb portion 30 of the moldable section 26 can be constructed as a tubular member with one open end (not shown) to form the entire thumb stall 16. The thumb portion 30 in this embodiment has the open end disposed adjacent the base portion 28, such that the open end allows for the thumb of a wearer to be inserted into the thumb portion 30 through the open end. Further, in this embodiment, the moldable section 26 can include a pair of base portions 28 on opposite sides of the thumb portion 30, such that the base portions 28 on each side of the moldable section 26 are connected to the palm portion 14 and back portion 12 of the glove 10, respectively.

The various moldable sections 20 and 26 utilized in the formation of the glove 11 are preferably formed of flexible materials, and more preferably from materials that provide various benefits to individuals wearing the glove 11 including the sections 20 and 26. Such materials include, but are not limited to, various polyolefins, polyurethanes, and other flexible moldable and thermoset materials, such as one or two component silicone rubber compositions. Further, the moldable materials selected for use in forming the moldable sections 20 and 26 of the glove 11 preferably have a durometer ranging from Shore 10 to Shore 80A, with a durometer of approximately Shore 40A being especially preferred. Additionally, when the moldable sections 20 and 26 are formed, they preferably have a thickness of between about 0.3 mm to about 1.2 mm, with a most preferred thickness for the moldable sections 20 and 26 being about 0.6 mm. Also, the thickness of the sections 20 and 26 can vary across the sections 20 and 26, such that different areas of each section 20 and/or 26 have different thicknesses from one another.

In addition to the flexibility of the materials, the moldable materials utilized to form the sections 20 and 26 must be capable of being utilized in an injection molding process, or other suitable molding process, whereby the moldable material forming the sections 20 and 26 is conformed by the mold to result in the desired shape for the various sections 20 and 26. In a preferred construction, the sections 20 and 26 are formed in the molding process such that the respective finger portions 24 and the thumb portion 30 are generally curved in shape to conform to the shape of the fingers and thumb of a wearer in the relaxed position.

In forming the sections 20 and 26 using the selected molding process, such as the process developed by Universal Trim Supply Co. of Taipei Hsein, Taiwan, various additional features can be added to the sections 20 and 26, and specifically to each of the finger portions 24 and the thumb portion 30, as desired. These features can be integrally formed with the individual section 20 and 26, such as by forming the additional features during the same molding process for the sections 20 and 26, or in a subsequent molding process that integrally bonds or forms the features on the sections 26. Further, depending on the particular form of the additional feature, that feature can be secured to the appropriate section 20 and/or 26 in a more conventional manner, such as by utilizing a suitable adhesive or a mechanical fastening means, such as stitching.

Those additional features which can be formed directly on or with the moldable sections 20 and 26 can be formed on the interior surface 32, the exterior surface 34 or both surfaces of the various sections 20 and 26. For example, as shown in FIGS. 4 and 8, each of the various finger portions 24 and thumb portion 30 can be formed to include a number of apertures 36 therein, allowing airflow into and out of the finger portions 24 and thumb portion 30. These apertures 36 can be formed in the sections 20 and 26 during the initial molding of the sections 20 and 26 as a result of certain features present in the mold used to form the sections 20 and 26, or can be punched through the sections 20 and 26 after molding. Preferably, the apertures 36 are formed after the formation of the sections 20 and 26 by utilizing a laser to cut through the material forming the sections 20 and 26 in a closely-controllable manner to form apertures 36 having the desired size and shape.

Another feature that can be added to one or more of the respective finger portions 24 and thumb portion 30 on the sections 20 and 26 is a number of gripping members 38 to enhance the ability of a person wearing the glove 10 to grasp an object. The gripping members 38 can be formed on the sections 20 and 26 during the initial molding of the sections 20 and 26 as a result of certain features present in the mold used to form the sections 20 and 26. Thus, the gripping members 38 can have any suitable form, such as suitable protrusions, knobs or other geometric or spherical structures, with a preferred form being a closely spaced arrangement of generally conical micro-teeth 40. Also the various gripping members 38 can be disposed at any point along the moldable sections 20 and 26, although in the preferred embodiment including the micro-teeth 40, the teeth 40 are disposed on the exterior surface 34 of the finger and thumb tip areas of each section 20 and 26. In other embodiments for the glove 11, the gripping members 38 can be formed on the interior surface 32 of the section 20 and 26, to provide added slip resistance characteristics and/or comfort attributes to the glove 11.

Furthermore, in another embodiment of the present invention, instead of forming each of the finger portions 24 integrally with the base portion 22, the portions 24 can be formed individually from one another such that one or more of the finger portions 24 can be formed using the selected moldable material, while other finger stalls 16 are formed of more conventional materials, such as a textile material or leather, or can be omitted entirely. In this embodiment, the base portion 22 for the section 20 is secured to the palm portion 14 and/or back portion 12, depending on the configuration for the moldable section 20, while the non-moldable finger components are secured to the palm portion 14 and/or back portion 12 in a conventional manner, e.g., utilizing an adhesive or a mechanical fastening means, such as stitching.

Figure 11:
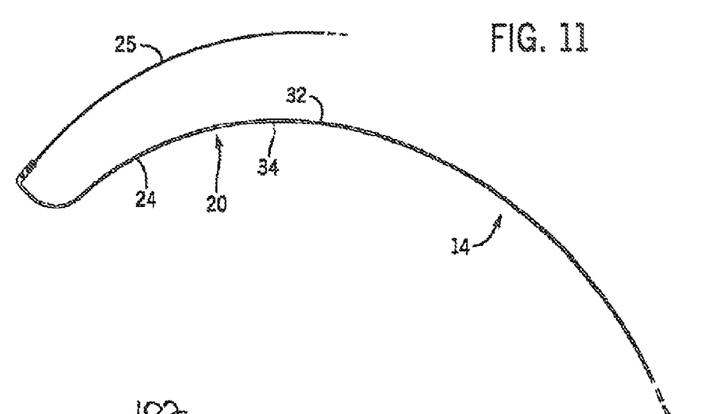
FIG. 11 is a cross-sectional, side plan view of a third embodiment of the article of clothing of the present invention.

In still another embodiment of the glove 11 of the present invention, the entire back portion 12 and/or palm portion 14 can include one or both of the sections 20 and 26, and, thus can be formed from the flexible, moldable material such that only one or neither of the back portion 12 or palm portion 14 of the glove 11 is formed of a conventional glove material. In a preferred version of this embodiment, as best shown in FIG. 11, the palm portion 14 is formed integrally with the moldable section 20. During the molding process, the palm portion 14 is formed to have a curved shape that generally conforms to the actual shape of the hand of a wearer, allowing the palm portion 14 and the glove 11 overall, to more closely fit the hand of a wearer. With this shape for the palm portion 14, the material forming the palm portion 14 does not bend, or bunch up similarly to prior art glove constructions when the wearer of the glove 11 flexes his or her hand within the glove 11, such that the tactile properties of the glove 11 are enhanced with respect to prior art glove construction.

This increased tactile attribute of the glove 11 can further be enhanced during the formation of the palm portion 14 by utilizing a mold for the palm portion 14, regardless of whether the palm portion 14 is integrally formed with the other moldable section 20 and/or 26, having a variable thickness across the mold. This varying thickness for the mold results in the formation of a palm portion 14 that has thinner areas of the palm portion 14 at locations where contact is normally made between the palm portion 14 and an object, such as a ball, bat or other sporting item, to provide enhanced tactile response to the hand of the wearer through the reduced thickness areas. Additionally, the as stated previously concerning the moldable sections 20 and 26, these sections 20 and 26, as well as a the individual finger portions 24 and thumb portion 30, can also be formed to have variable thicknesses across the various parts of the glove 11 formed from the moldable material, in order to provide the same enhanced tactile attributes to those parts of the glove 11.

As stated previously, any combination of the various glove portions 12, 14, 20 and 26 can be formed of the moldable material, with the remainder of the portions 12, 14, 20 and/or 26 being formed on a more conventional glove material. If one or more adjoining portions 12, 14, 20 and/or 26 are formed from the moldable material, these portions can be secured to one another in any suitable manner used to connect members formed from a moldable material, such as by molding or bonding the portions to one another, or simply integrally forming the portions with each other in a single molding process.

Also, for those sections 12, 14, 20 and 26, formed of a non-moldable material and disposed immediately adjacent one another, those sections of the glove 11 can be secured to one another any suitable securing means, such as by stitching or by otherwise suitably bonding the sections to each other, such as by conventional adhesive or thermal bonding techniques.

Figure 9:
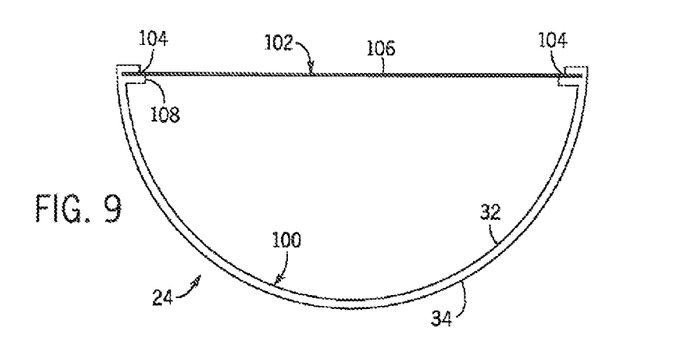
FIG. 9 is a cross-sectional view along line 9-9 of FIG. 1.
Figure 10:
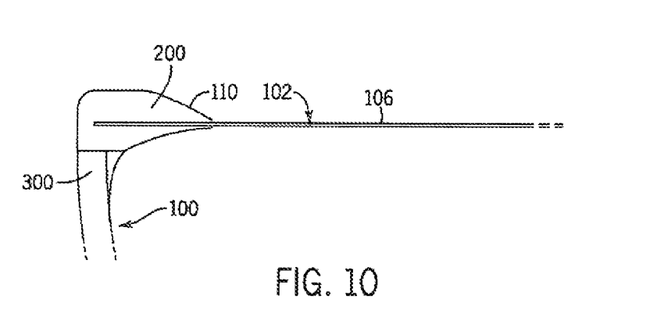
FIG. 10 is a partially broken away, cross-section view of a second embodiment of the article of clothing constructed according to the present invention.
Figure 12:
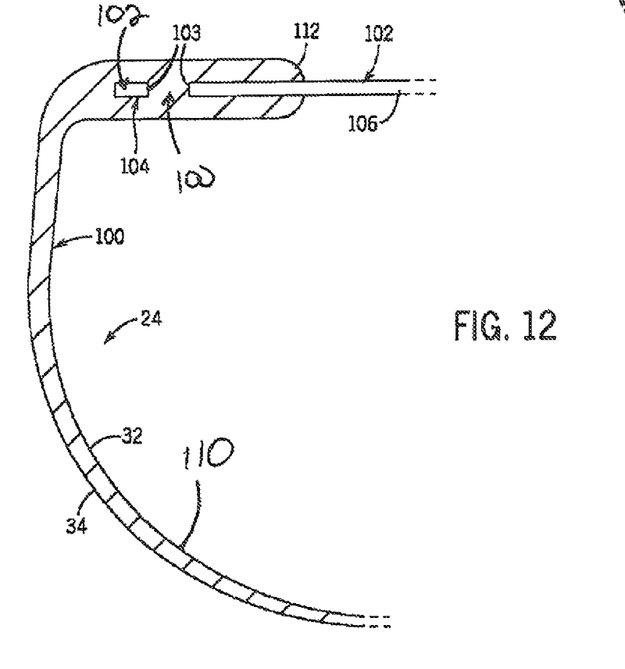
FIG. 12 is a partially broken away cross-sectional view of the tip of a finger of the article of clothing of FIG. 11.

Looking now at FIGS. 9, 10 and 12, with regard to securing the various moldable parts 100 to the non-moldable parts 102 such as portion 25 of the finger stall 16 of FIG. 1, initially the non-moldable parts 102 are formed to have the desired shape in light of the proposed structure for the glove 11. Next, these pre-formed non-moldable parts 102 are positioned within the mold (not shown) for the moldable parts 100 of the glove 11 at the proper locations for the non-moldable parts 102 in the finished glove construction. The positioning of the non-moldable parts 102 in the mold exposes the a selected portion of the peripheral edge 104 of each non-moldable part 102, while completely covering or obscuring those areas 106 of the non-moldable parts 102 that are to be exposed in the final glove construction. Then the moldable material selected to be used in forming the moldable parts 100 is introduced into the mold in a suitable manner, such as by utilizing the process developed by Universal Trim Supply Co. of Taipei Hsein, Taiwan. The moldable material flows through the mold and around each of the exposed edges 104 of the non-moldable parts 102 disposed in the mold. Once the moldable material has completely filled the mold cavity, the material is allowed to cool, thereby forming the moldable part 100 for the glove 11 having the desired components, e.g., the desired number of finger portions 24 or thumb portion 30, the desired number of base portions 22 or 28, the desired number, form and positioning of any gripping members 38, and the desired thickness of the various areas of the moldable parts 100. The cooling of the moldable material within the mold also enables the moldable material, which is urged into intimate and inter-engaging contact with the exposed edges 104 of the non-moldable parts 102 in the mold upon introduction of the moldable material into the mold, to solidify around the exposed edges 104 of the non-moldable parts 102 in a manner that intimately bonds and engages the moldable material part 100 with the exposed edge 104 of the non-moldable part(s) 102 without the need for any additional securing or attachment members, such as adhesives or stitching. Preferably, the moldable parts 100 are secured and bonded to the non-moldable parts 102 on both sides of the non-moldable parts 102, such that the non-moldable parts 102 are sandwiched between separate portions of the moldable parts 100 adjacent the parts 102 in an overlapping configuration. However, it is also contemplated that the moldable parts 100 can be formed to overlap the non-moldable parts 102 on only one side of the parts 102, if desired or necessary. Also to assist in integrally securing the moldable parts 100 to the non-moldable parts 102, the non-moldable parts 102 can be formed with apertures 103 through which the material forming the moldable parts 100 can flow when being formed with the non-moldable parts 102. The material forming the moldable parts 100 solidifies within the apertures 103 when cooled, further securing the moldable parts 100 to the non-moldable parts 102.

As a result of this process, in a particularly preferred embodiment for the glove 11, the moldable part 100 forms the bottom, sides, and a part of the top of the various parts of the glove 11, while the non-moldable part 102 forms the majority of the top surface of the respective part of the glove 11. However, the non-moldable parts 102 can also be formed to form the entire top of each glove portion, or even to form part of the sides of the glove portions, if desired or necessary.

As best shown in FIG. 10, it is also possible to form the moldable part 100 of separate moldable materials, such that the part 100 includes a first material 200 molded in engagement with the edge 104 of the non-moldable part 102 in the manner described previously, and a second material 300 molded into engagement with the first material 200. In this construction, as a result of the use of different moldable materials, the moldable parts 100 of the glove 11 can be formed with even more varied properties due to the different properties or attributes of the different materials 200 and 300 forming the moldable parts 100 of the glove 11.

Further, the shape of the portion of the moldable part 100 that is secured to the edge 104 of the non-moldable part 102 can be varied, such as between an annular shoulder 108, a tapered edge 110, and a curved edge 112, to provide a various profiles for the exterior of the glove 11.

In addition to the aforementioned embodiments, the glove 11 can be formed with a liner (not shown) formed of a suitable insulating or wicking material, e.g., a woven or non-woven knit material, can be secured to the interior surface 32 of the glove 11. The liner can be secured directly to the entire interior surface 32 of the glove 11, or to only one or more parts of the interior surface 32 of the glove 10, or only to certain points disposed about the interior surface 32 when the liner only covers a portion of the interior surface 32 of the glove 101.

Also, the glove 11 can be formed with a cuff member 400 secured to the back portion 12 and the palm portion 14 of the glove 11 opposite the finger stalls 16 and thumb stall 18. The cuff member is secured to each of the back portion 12 and palm portion 14 of the glove 11 via a suitable non-stitching technique to provide a stitching margin (not shown) on each of the back portion 12 and the palm portion 14 to enable a separate cuff (not shown) to be attached to the glove 11 by stitching without damaging the moldable materials used in the formation of the palm portion 14 and/or the back portion 12.

While the above description has focused on the glove 11 as the primary embodiment of the article of clothing 10, it is also contemplated that other articles of clothing 10 can be manufactured with one portion of the article formed of a flexible, moldable material that is secured directly to a second portion of the article that is not formed of a moldable material. These other articles of clothing 10 can include garments to be worn on the torso or legs, shoes, or braces, such as flexible medical braces, among others.

Various alternatives are contemplated as being within the scope of the following claims particularly pointing out and distinctly claiming the subject matter regarded as the invention.

What is claimed is:

1. A method for forming a glove by the process comprising the steps of:
   a) forming a back portion of the glove from a non-moldable material;
   b) placing the back portion of the glove within a mold used to form a palm portion of the glove in a position that exposes at least a portion of the peripheral edge of the back portion;
   c) introducing an amount of a moldable, flexible material into the mold around the portion of the peripheral edge of the back portion; and
   d) allowing the moldable, flexible material forming the palm portion to be secured with the exposed portion of the peripheral edge of the back portion.

2. The method of claim 1 wherein the step of forming the back portion comprises forming a number of openings along the exposed portion of the peripheral edge of the back portion that extend through the back portion.

3. The method of claim 2 wherein the step of allowing the moldable material to be secured with the exposed portion of the peripheral edge comprises allowing the moldable material to flow into the number of openings in the exposed portion of the peripheral edge.

4. The method of claim 1 wherein the step of allowing the moldable material to be secured with the exposed portion of the peripheral edge comprises allowing the moldable material to flow over a back side and a front side of the exposed portion of the peripheral edge.

5. The method of claim 1 further comprising the step of forming the palm portion of the moldable material with a curved shape.

\* \* \* \* \*